May 6, 1969 G. L. SHIRA 3,442,215
POSITION MARKER FOR ENTANGLEMENT IN TREE TOPS
Filed Aug. 18, 1967
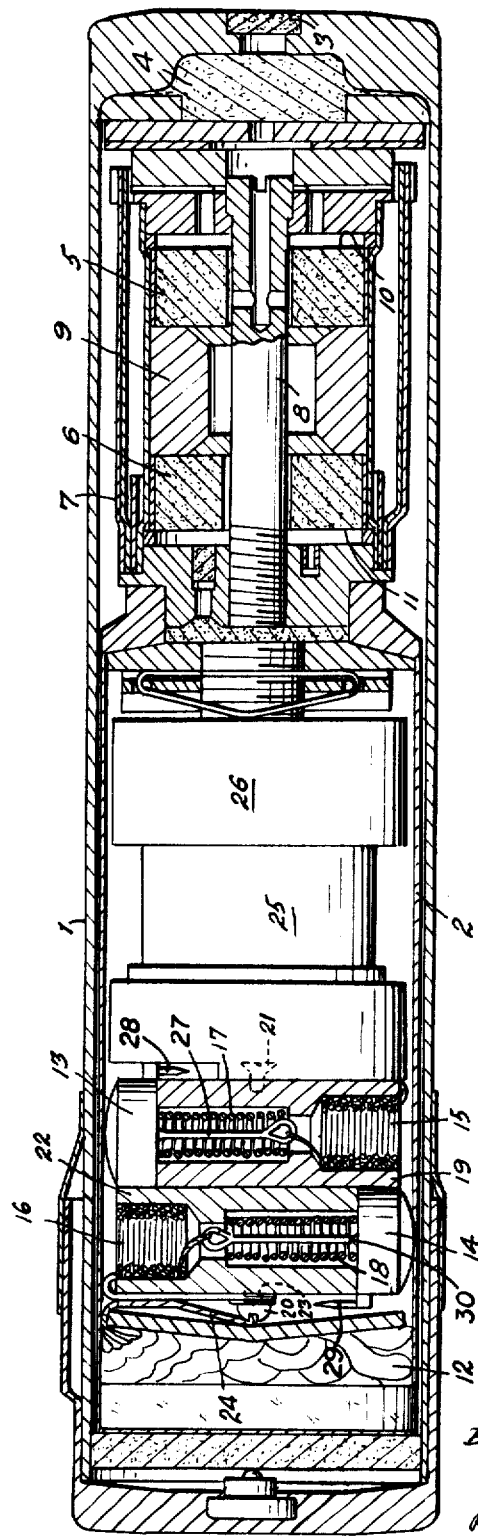
INVENTOR,
Glenn L. Shira
By: Harry M. Saragovitz,
Edward J. Kelly,
Herbert Berl &
R. P. Gibson ATTORNEYS.

United States Patent Office 3,442,215
Patented May 6, 1969

3,442,215
POSITION MARKER FOR ENTANGLEMENT IN TREE TOPS
Glenn L. Shira, Newark, Del., assignor to the United States of America as represented by the Secretary of the Army
Filed Aug. 18, 1967, Ser. No. 661,730
Int. Cl. F42b 13/44
U.S. Cl. 102—90                                    2 Claims

ABSTRACT OF THE DISCLOSURE

An apparatus to mark a particular object or men from an airborne vehicle for aerial observation in heavily wooded areas or under jungle canopy, designed to maintain a smoke marker on top of the jungle canopy by entanglement of tree entanglement members and cables attached thereto. A marker, so positioned, has the advantage of being visible at greater distances and may not be as easily extinguished at that height as a smoke marker that reaches the gound level.

The invention described herein may be manufactured, used, and licensed by or for the Government for governmental purposes without the payment to me of any royalty thereon.

Summary

The smoke marker of this apparatus is ejected in the air along with tree entanglement members attached to the smoke cartridge and to each other by cables which spread in the air and become entangled on contact with the tree tops to maintain the smoke cartridges at that height to markt a certain posiion. The essenial features of this device are the capability of the spring loaded tree entanglement members ejected in the air in opposite directions, to assume an outstretched position and to unwind the coils of stainless steel wire during the descent; also the utilization of the principle of free-falling bodies for the tree entanglement members which during descent fall at the same rate in an outstretched position but faster than he smoke cannister which is deterred by a parachute; this permits the hooks and cable to reach the tree-tops for better or more secure entanglement prior to the landing of the smoke marker.

Brief description of drawing

The drawing is a diagrammatical longitudinal section of the position marker and the smoke cartridge assembly.

In the drawing, the smoke cartridge assembly is contained in the rocket barrel 1, within which is an inner capsule 2 containing all of the assembly and is adapted to be fired from the rocket barrel 1. The position marker is composed of a rear assembly having a primer 3, an initiating black powder charge 4 which fires the propellant charges 5 and 6 in the container 7, which is connected to the capsule 2; the propellant charges 5 and 6 are held in position by a bolt 8 but maintained apart by a spacer member 9; the propellant 5 has a rear face 10 inhibited while the forward face 11 of the propellant 6 is uninhibited; the forward assembly contains the smoke cartridges 25 and 26, the parachute 12, the rear tree entanglement member 13 and the forward tree entanglement member 14 connected respectively to the coiled cables 15 and 16 held in coiled condition by the compression springs 17 and 18 which in turn are retained in that position by the respective tree entanglement member of the unit. The rear positioned tree entanglement member 13, the coiled cable 15 and the compression spring 17 are contained in a rear housing 19 which is attached to the smoke cartridges 25 and 26 by a screw threaded member 21; the forward positioned tree entanglement member 14, the coiled cable 16 and the compression spring 18 are contained in a forward housing 22, disposed adjacent the rear housing 19 the forward face of which contains a screw-threaded member 23 having a cap 20 connected by a cord 24 to the parachute 12. Each unit consisting of the tree engaging member cable and spring is retained in its respective housing by the capsule 2 and is released when ejected from the capsule 2.

Both housings 19 and 22 are arranged in opposite relation in capsule 2 and their longitudinal axes are disposed substantially normal to the longitudinal axis of the position marker, as shown.

Both tree entanglement members 13 and 14 may consist of a hook, the shank of the hooks being indicated by 27 and 30 while at least one barb of each hook is indicated by 28 and 29 in the drawing.

Operation

The primer 3 initiates the black powder charge 4 to fire the propellant charges 5 and 6 to discharge the assembly from the rocket barrel 1 and in so doing ignites the smoke cartridges 25 and 26; upon ejection from the capsule 2 the parachute 12 is projected in the air and is deployed to impart stability to the smoke cartridges in the descent; immediately after the parachute 12 is ejeced, the tree entanglement members 13 and 14 follow it out of the capsule 2 and are projected in opposite directions by the released compression springs 17 and 18 causing the tree entanglement members 13 and 14 to pull and unwind the attached coiled cables in the air; the tree entanglement members 13 and 14 being ejected in opposite directions which tends to spread them apart; and since they act as free-falling bodies, they therefore are falling faster than the smoke cartridges which are steadied by the parachute 12 and may assume a position a distance in front thereof as limited by the length of the unwound cables; by reason of the foregoing, the tree entanglement members reach the target first and together with their attached cables become entangled in the tree tops in an outstretched position which is due primarily o the original projection and are able to maintain the smoke cannster at tree-top level when it lands.

This device is designed primarily for launching from the ground but obviously could be employed from an airborne vehicle for the same purpose.

What is claimed is:

1. In a position marker for entanglement in tree tops including a rocket barrel having initiating charges in its rearward end, a propelling assembly housed in the rearward end thereof, said propelling assembly containing a propellant charge adapted to be fired by said initiating charges and an inner capsule carried by the forward end of said propelling assembly; a smoke cartridge assembly housed in said capsule and comprising smoke cartridges adapted to be fired by said propellant charge, a pair of oppositely arranged housings carried by the forward end of said cartridges, their longitudinal axes being substantially normal to the longitudinal axis of said postion marker, a spring and a spring loaded tree entanglement member housed in each said housing and normally restrained by the inner surface of said capsule, and a parachute housed forwardly of said housings and connected thereto, whereby when said propellant charge is fired by said initiating charges, said propelling assembly and said cartridge assembly are ejected from said barrel and when said parachute is billowed said housings are freed from said capsule to release said tree entanglement members to eject from their respective housings in opposite lateral directions and become entangled in tree tops.

2. A device as claimed in claim 1 wherein each tree entanglement member housed in each of said housing includes a coiled cable and at least one hook, said cable being attached at one of its ends to its respective hook whereby when said housings are separated from said capsule by said parachute, said hook will be ejected by action of the spring outward to uncoil said cable.

References Cited

UNITED STATES PATENTS

| | | | |
|---|---|---|---|
| 1,011,002 | 12/1911 | Wünsche | 102—63 |
| 1,759,912 | 5/1930 | Mount | 102—63 |
| 2,419,430 | 4/1947 | Weinert | 102—63 |
| 2,447,971 | 8/1948 | Weinert | 102—89 |
| 2,519,123 | 8/1950 | Dwyer et al. | 102—35.6 |
| 3,056,351 | 10/1962 | Bares | 102—35.6 |
| 3,105,438 | 10/1963 | Aberg | 102—35.6 |

FOREIGN PATENTS 119,316  10/1918  Great Britain.

BENJAMIN A. BORCHELT, *Primary Examiner.*

JAMES FOX, *Assistant Examiner.*

U.S. Cl. X.R.

102—35.6